US007718710B2

(12) United States Patent
Zhang et al.

(10) Patent No.: US 7,718,710 B2
(45) Date of Patent: May 18, 2010

(54) STABLE CONCENTRATED METAL COLLOIDS AND METHODS OF MAKING SAME

(75) Inventors: Cheng Zhang, Lawrenceville, NJ (US); Sukesh Parasher, Lawrenceville, NJ (US); Michael A. Rueter, Plymouth Meeting, PA (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 469 days.

(21) Appl. No.: 11/378,057

(22) Filed: Mar. 17, 2006

(65) Prior Publication Data

US 2007/0219083 A1 Sep. 20, 2007

(51) Int. Cl.
*C09K 3/00* (2006.01)
*B01J 31/00* (2006.01)
*B01J 23/00* (2006.01)

(52) U.S. Cl. .......................... 516/97; 502/150; 502/300

(58) Field of Classification Search .................... 516/59
See application file for complete search history.

(56) References Cited

U.S. PATENT DOCUMENTS

| | | | | |
|---|---|---|---|---|
| 3,992,331 | A | 11/1976 | Petrow et al. ............... 502/339 |
| 3,992,512 | A * | 11/1976 | Petrow et al. ............ 423/512.1 |
| 4,007,256 | A | 2/1977 | Kim et al. .................... 423/584 |
| 4,009,252 | A | 2/1977 | Izumi et al. .................. 423/584 |
| 4,028,274 | A | 6/1977 | Kunz .......................... 252/447 |
| 4,064,154 | A | 12/1977 | Chandra et al. ........... 260/448.2 |
| 4,070,401 | A | 1/1978 | Hirai et al. ................... 564/417 |
| 4,083,803 | A | 4/1978 | Oswald et al. ............... 502/158 |
| 4,128,627 | A | 12/1978 | Dyer et al. ................... 423/584 |
| 4,148,750 | A | 4/1979 | Pine ............................ 502/26 |
| 4,195,003 | A | 3/1980 | Hurlock et al. .............. 524/417 |
| 4,279,883 | A | 7/1981 | Izumi et al. .................. 423/584 |
| 4,313,806 | A | 2/1982 | Dalton, Jr. et al. ........... 205/724 |
| 4,335,092 | A | 6/1982 | Dalton, Jr. et al. ........... 423/584 |
| 4,336,238 | A | 6/1982 | Dalton, Jr. et al. ........... 423/584 |
| 4,336,239 | A | 6/1982 | Dalton, Jr. et al. ........... 423/584 |
| 4,336,240 | A | 6/1982 | Moseley et al. .............. 423/584 |
| 4,347,231 | A | 8/1982 | Michaelson .................. 423/584 |
| 4,347,232 | A | 8/1982 | Michaelson .................. 423/584 |
| 4,366,085 | A | 12/1982 | Ikegami et al. .............. 502/155 |
| 4,369,128 | A | 1/1983 | Moseley et al. .............. 502/169 |
| 4,379,778 | A | 4/1983 | Dalton, Jr. et al. ........... 423/584 |
| 4,476,242 | A | 10/1984 | Puskas et al. ................ 502/185 |
| 4,503,160 | A | 3/1985 | Williams, Jr. ............... 502/158 |
| 4,513,098 | A | 4/1985 | Tsao .......................... 502/216 |
| 4,581,344 | A | 4/1986 | Ledoux et al. .............. 502/304 |
| 4,652,311 | A * | 3/1987 | Gulla et al. ................. 106/1.11 |
| 4,661,337 | A | 4/1987 | Brill .......................... 423/584 |
| 4,681,751 | A | 7/1987 | Gosser ....................... 423/584 |
| 4,701,428 | A | 10/1987 | Bellussi et al. ................ 502/8 |
| 4,713,363 | A | 12/1987 | Hucul ........................ 502/262 |
| 4,760,187 | A | 7/1988 | Kosak ........................ 564/417 |
| 4,772,458 | A | 9/1988 | Gosser et al. ............... 423/584 |
| 4,824,976 | A | 4/1989 | Clerici et al. ............... 549/531 |
| 4,826,795 | A | 5/1989 | Kitson et al. ................ 502/184 |
| 4,832,938 | A | 5/1989 | Gosser et al. ............... 423/584 |
| 4,889,705 | A | 12/1989 | Gosser ....................... 423/584 |
| 4,937,216 | A | 6/1990 | Clerici et al. ................ 502/62 |
| 4,937,220 | A | 6/1990 | Nickols, Jr. ................. 502/185 |
| 4,983,558 | A | 1/1991 | Born et al. .................... 502/31 |
| 4,996,039 | A | 2/1991 | Pralus et al. ................ 423/584 |
| 5,017,535 | A | 5/1991 | Schoonhoven ............... 502/30 |
| 5,024,905 | A | 6/1991 | Itoh et al. ..................... 429/44 |
| 5,061,671 | A | 10/1991 | Kitson et al. ................ 502/185 |
| 5,096,866 | A | 3/1992 | Itoh et al. .................... 502/101 |
| 5,104,635 | A | 4/1992 | Kanada et al. .............. 423/584 |

(Continued)

FOREIGN PATENT DOCUMENTS

| | | |
|---|---|---|
| EP | 0864362 | 9/1998 |
| EP | 0 978 316 | 2/2000 |
| EP | 1 160 195 | 12/2001 |
| EP | 1 160 196 | 12/2001 |
| EP | 1 277 701 | 7/2002 |
| EP | 1 308 416 | 5/2003 |
| EP | 1 344 747 | 9/2003 |

(Continued)

OTHER PUBLICATIONS

Ahmadi, et al., "Shape-Controlled Synthesis of Colloidal Platinum Nanoparticles" *Science*, vol. 272, pp. 1924-1926 (Jun. 28, 1996).
Henglein, et al., "Absorption Spectrum and Some Chemical Reactions of Colloidal Platinum in Aqueous Solution," J. Phys. Chem., 99, 14129-14136 (1995).
Li, et al., "Carbon Nanotubes as Support for Cathode Catalyst of a Direct Methanol Fuel Cell", Letters to the Editor/Carbon 40, Dalian University of Technology, pp. 787-803 (Jan. 18, 2002).

(Continued)

*Primary Examiner*—Ling-Siu Choi
*Assistant Examiner*—Chun-Cheng Wang
(74) *Attorney, Agent, or Firm*—Workman Nydegger

(57) ABSTRACT

A method for manufacturing stable concentrated colloids containing metal nanoparticles in which the colloid is stabilized by adding a base. This allows the metal particles to be formed in higher concentration without forming larger agglomerates and/or precipitating. The method of manufacturing the stable colloidal metal nanoparticles of the present invention generally includes (i) providing a solution comprising a plurality of metal atoms, (ii) providing a solution comprising a plurality of organic agent molecules, each organic agent molecule comprising at least one functional group capable of bonding to the metal atoms, (iii) reacting the metal atoms in solution with the organic agent molecules in solution to form a mixture comprising a plurality of complexed metal atoms, (iv) reducing the complexed metal atoms in the mixture using a reducing agent to form a plurality of nanoparticles, and (v) adding an amount of a base to the mixture, thereby improving the stability of the nanoparticles in the mixture. The base may be added before or after forming the nanoparticles.

22 Claims, No Drawings

U.S. PATENT DOCUMENTS

| | | | |
|---|---|---|---|
| 5,128,114 A | 7/1992 | Schwartz | 423/335 |
| 5,132,099 A | 7/1992 | Hiramatsu et al. | 423/584 |
| 5,135,731 A | 8/1992 | Gosser et al. | 423/584 |
| 5,166,372 A | 11/1992 | Crocco et al. | 549/531 |
| 5,169,267 A | 12/1992 | Cowper | 406/49 |
| 5,169,618 A | 12/1992 | Maraschino | 423/584 |
| 5,180,573 A | 1/1993 | Hiramatsu et al. | 423/584 |
| 5,194,242 A | 3/1993 | Paoli | 423/584 |
| 5,214,168 A | 5/1993 | Zajacek et al. | 549/531 |
| 5,234,584 A | 8/1993 | Birbara et al. | 210/181 |
| 5,235,106 A | 8/1993 | Didillon et al. | 564/417 |
| 5,236,692 A | 8/1993 | Nagashima et al. | 423/584 |
| 5,320,821 A | 6/1994 | Nagashima et al. | 423/584 |
| 5,338,531 A | 8/1994 | Chuang et al. | 423/584 |
| 5,352,645 A | 10/1994 | Schwartz | 502/262 |
| 5,362,405 A | 11/1994 | Birbara | 210/763 |
| 5,372,981 A | 12/1994 | Witherspoon | 502/155 |
| 5,378,450 A | 1/1995 | Tomita et al. | 423/584 |
| 5,391,531 A | 2/1995 | Ward | 502/208 |
| 5,399,334 A | 3/1995 | Kawakami et al. | 423/584 |
| 5,399,344 A | 3/1995 | Yang et al. | 424/84 |
| 5,447,706 A | 9/1995 | Van Weynbergh et al. | 423/584 |
| 5,460,734 A | 10/1995 | Birbara et al. | 210/763 |
| 5,480,629 A | 1/1996 | Thompson et al. | 423/584 |
| 5,496,532 A | 3/1996 | Monzen et al. | 423/584 |
| 5,505,921 A | 4/1996 | Luckoff et al. | 423/584 |
| 5,580,839 A | 12/1996 | Huffman et al. | 502/338 |
| 5,583,085 A | 12/1996 | Ward | 502/232 |
| 5,608,112 A | 3/1997 | Schwartz | 564/415 |
| 5,641,467 A | 6/1997 | Huckins | 423/584 |
| 5,641,723 A | 6/1997 | Bonnemann et al. | 502/326 |
| 5,679,858 A | 10/1997 | Langer et al. | 564/423 |
| 5,698,488 A | 12/1997 | Birbara et al. | 502/325 |
| 5,767,036 A | 6/1998 | Freund et al. | 502/185 |
| 5,846,895 A | 12/1998 | Gila et al. | 502/107 |
| 5,846,898 A | 12/1998 | Chuang et al. | 502/181 |
| 5,851,948 A | 12/1998 | Chuang et al. | 502/314 |
| 5,859,265 A | 1/1999 | Muller et al. | 549/531 |
| 5,900,386 A | 5/1999 | Freund et al. | 502/330 |
| 5,912,367 A | 6/1999 | Chang | 549/529 |
| 5,925,588 A | 7/1999 | Chuang et al. | 502/187 |
| 5,939,220 A | 8/1999 | Gunner et al. | 429/40 |
| 5,961,948 A | 10/1999 | Wanngard | 423/584 |
| 5,962,365 A | 10/1999 | Langer et al. | 502/180 |
| 5,962,741 A | 10/1999 | Baumeister et al. | 564/417 |
| 5,965,101 A | 10/1999 | Goto et al. | 423/584 |
| 5,972,305 A | 10/1999 | Park et al. | 423/587 |
| 6,005,155 A | 12/1999 | Sun | 585/640 |
| 6,042,804 A | 3/2000 | Huckins | 423/584 |
| 6,054,507 A | 4/2000 | Funaki et al. | 523/210 |
| 6,090,858 A | 7/2000 | El-Sayed | 516/97 |
| 6,106,797 A | 8/2000 | Muller et al. | 423/584 |
| 6,117,409 A | 9/2000 | Bertsch-Frank et al. | 423/584 |
| 6,159,267 A | 12/2000 | Hampden-Smith | 75/252 |
| 6,168,775 B1 | 1/2001 | Zhou et al. | 423/584 |
| 6,194,338 B1 | 2/2001 | Andolfatto et al. | 502/101 |
| 6,210,651 B1 | 4/2001 | Nystrom et al. | 423/584 |
| 6,239,054 B1 | 5/2001 | Shukis et al. | 502/29 |
| 6,284,213 B1 | 9/2001 | Paparatto et al. | 423/403 |
| 6,294,696 B1 | 9/2001 | Didillon et al. | 564/422 |
| 6,299,852 B1 | 10/2001 | Nystrom et al. | 423/584 |
| 6,307,073 B1 | 10/2001 | Jones | 549/532 |
| 6,316,673 B2 | 11/2001 | Giera et al. | 564/423 |
| 6,331,500 B1 | 12/2001 | Tsuji et al. | 502/63 |
| 6,375,920 B2 | 4/2002 | Fischer et al. | 423/584 |
| 6,387,346 B1 | 5/2002 | Bertsch-Frank | 423/584 |
| 6,447,743 B1 | 9/2002 | Devic et al. | 423/584 |
| 6,455,594 B1 * | 9/2002 | Tsuji | 516/97 |
| 6,462,095 B1 | 10/2002 | Bonsel et al. | |
| 6,500,968 B2 | 12/2002 | Zhou et al. | 549/531 |
| 6,500,969 B1 | 12/2002 | Zhou et al. | 549/531 |
| 6,504,040 B1 | 1/2003 | Vogtel et al. | 549/525 |
| 6,518,217 B2 | 2/2003 | Xing et al. | 502/230 |
| 6,528,683 B1 | 3/2003 | Heidemann et al. | 562/542 |
| 6,534,440 B2 | 3/2003 | Choudhary et al. | 502/333 |
| 6,534,661 B1 | 3/2003 | Zhou et al. | 549/531 |
| 6,551,960 B1 | 4/2003 | Laine et al. | 502/327 |
| 6,576,214 B2 | 6/2003 | Zhou et al. | 423/584 |
| 6,630,118 B2 | 10/2003 | Paparatto et al. | 423/584 |
| 6,635,348 B1 | 10/2003 | Hampden-Smith | 428/402 |
| 6,649,140 B2 | 11/2003 | Paparatto et al. | 423/584 |
| 6,676,919 B1 | 1/2004 | Fischer et al. | 423/584 |
| 6,713,036 B1 | 3/2004 | VandenBussche et al. | 423/584 |
| 6,740,615 B2 | 5/2004 | Zhou | 502/29 |
| 6,746,597 B2 | 6/2004 | Zhou et al. | 208/138 |
| 6,764,671 B2 | 7/2004 | Haas et al. | 423/584 |
| 6,768,013 B1 | 7/2004 | Pujado | 549/532 |
| 6,815,391 B2 | 11/2004 | Xing et al. | 502/184 |
| 6,872,377 B2 | 3/2005 | Fischer et al. | 423/584 |
| 6,888,013 B2 | 5/2005 | Paparatto et al. | 549/532 |
| 6,908,873 B2 | 6/2005 | Zhou et al. | 502/29 |
| 6,953,822 B2 | 10/2005 | Locken et al. | 524/460 |
| 7,011,807 B2 | 3/2006 | Zhou et al. | 423/584 |
| 7,045,479 B2 | 5/2006 | Zhou et al. | 502/125 |
| 7,048,902 B2 | 5/2006 | Paparratto et al. | 423/584 |
| 7,060,244 B2 | 5/2006 | Devic et al. | 423/584 |
| 2001/0024634 A1 | 9/2001 | Bertsch-Frank et al. | 423/583 |
| 2003/0104936 A1 | 6/2003 | Mao et al. | 502/339 |
| 2003/0180212 A1 | 9/2003 | Huckins | 423/584 |
| 2003/0215383 A1 | 11/2003 | Escrig et al. | 423/584 |
| 2004/0013601 A1 | 1/2004 | Butz et al. | 423/584 |
| 2004/0037770 A1 | 2/2004 | Fischer et al. | 423/584 |
| 2004/0081611 A1 | 4/2004 | Muller et al. | 423/584 |
| 2004/0087441 A1 | 5/2004 | Bock et al. | 502/313 |
| 2004/0101718 A1 | 5/2004 | Cao et al. | 429/13 |
| 2004/0126312 A1 | 7/2004 | Butz et al. | 423/584 |
| 2004/0147618 A1 | 7/2004 | Lee et al. | |
| 2004/0151659 A1 | 8/2004 | Paparatto et al. | 423/584 |
| 2004/0151660 A1 | 8/2004 | Paparatto et al. | 423/584 |
| 2004/0184983 A1 | 9/2004 | Paparatto et al. | 423/584 |
| 2004/0241502 A1 | 12/2004 | Chung et al. | 428/702 |
| 2006/0079396 A1 | 4/2006 | Saito | |

FOREIGN PATENT DOCUMENTS

| | | |
|---|---|---|
| GB | 1056125 | 1/1967 |
| JP | 05017106 | 1/1993 |
| JP | 07033410 | 2/1995 |
| JP | 07069604 | 3/1995 |
| JP | 07069605 | 3/1995 |
| JP | 07241473 | 9/1995 |
| JP | 09241009 | 9/1997 |
| JP | 09301705 | 11/1997 |
| JP | 1032407 | 12/1998 |
| JP | 10330103 | 12/1998 |
| JP | 2003010693 | 1/2003 |
| JP | 2003024794 | 1/2003 |
| WO | WO9810863 | 3/1998 |
| WO | WO 00/59635 | 10/2000 |
| WO | WO 01/05501 | 1/2001 |
| WO | WO 02/14217 | 2/2002 |
| WO | WO 02/14299 | 2/2002 |
| WO | WO 02/28527 | 4/2002 |
| WO | WO 02/28528 | 4/2002 |
| WO | WO 02/083550 | 10/2002 |
| WO | WO 02/092501 | 11/2002 |
| WO | WO 02/092502 | 11/2002 |
| WO | WO 03/014014 | 2/2003 |

| | | |
|---|---|---|
| WO | WO2004078740 | 9/2004 |

OTHER PUBLICATIONS

Li, et al., "Preparation and Characterization of Multiwalled Carbon Nanotube—Supported Platinum for Cathode Catalysts of Direct Methanol Fuel Cells", J. Phys. Chem, B, Vol. 107, pp. 6292-6299 (Jun. 6, 2003).

Lordi, et al., "Method for Supporting Platinum on Single-Walled Carbon Nanotubes for a Selective hydrogenation Catalyst", Chem. Mater., vol. 13, pp. 733-737 (Feb. 10, 2001).

Petroski, et al., "Kinetically Controlled Growth and Shape Formation Mechanism of Platinum Nanoparticles," J. Phys. Chem. B, 102, 3316-3320 (1998).

Zhou, et al., "Novel Synthesis of Highly Active Pt/C Cathode Electrocatalyst for Direct Methanol Fuel Cell" Chem. Commun. 2003, pp. 394-395.

Zhou, et al. "Preparation and Characterization of Anode Catalysts PtRu/C for Direct Methanol Fuel Cells" Chemical Journal of Chinese Universities, vol. 24, 2003, pp. 885-862.

* cited by examiner

000
STABLE CONCENTRATED METAL COLLOIDS AND METHODS OF MAKING SAME

BACKGROUND OF THE INVENTION

1. The Field of the Invention

The present invention relates to the manufacture of colloids containing metal nanoparticles. More particularly, the invention relates to concentrated metal nanoparticle colloids that are stabilized using a base.

2. Related Technology

Particulate catalysts are an important component of many industrial applications such as refining, organic synthesis, fine chemicals manufacturing, and many other industrial processes. Many of these catalyzed reactions require the use of precious metals such as platinum and palladium. Much effort has been made to make high performance catalysts that improve product yields for a given amount of precious metal used.

One technique for making high performance catalysts is to form particles in a solution using metal salts and an organic dispersing agent. The metal salts are dissolved in a solvent, reacted with the organic agent, and then reduced to cause formation of nanoparticles dispersed in the solvent. Because the particles are very small, e.g., less than 1 micron, the dispersed particles form a colloid. The colloidal particles are typically deposited on a catalyst support.

One problem with making catalysts through a colloidal process is that the concentration of metal must be kept low to prevent precipitation and agglomeration of the metal. Using known manufacturing techniques, attempts to make concentrated colloids have resulted in loss of the precious metal particles. Concentrating the colloid destabilizes the particles and causes the particles to agglomerate and/or precipitate. Particles that precipitate are not suitable for use as high performance catalysts and/or cannot be easily deposited on a support material.

Consequently, existing methods for manufacturing supported nanoparticles catalyst use metal colloids that have dilute concentrations of metal particles. The low concentration metal colloids are somewhat difficult to use because of the relatively large solvent requirements. If the colloid is to be shipped, the excess weight and volume of the solvent significantly increases shipping costs. In addition, applying the particles to a support material is more difficult and expensive because the excess solvent must be removed.

BRIEF SUMMARY OF THE INVENTION

The present invention provides a method for manufacturing stable concentrated colloids containing metal nanoparticles. The colloid is stabilized by adding a base, which allows the metal particles to be formed in higher concentration without precipitating.

The method of manufacturing the nanoparticles of the present invention generally includes (i) providing a solution comprising a plurality of metal atoms, (ii) providing a solution comprising a plurality of organic agent molecules, each organic agent molecule comprising at least one anion, (iii) reacting the metal atoms in solution with the organic agent molecules in solution to form a mixture comprising a plurality of complexed metal atoms, (iv) reducing the complexed metal atoms in the mixture using a reducing agent to form a plurality of nanoparticles, and (v) adding an amount of a base to the mixture, thereby improving the stability of the nanoparticles in the mixture. The base can be added before or after particle formation.

The organic dispersing agent includes at least one functional group that can bond to the catalyst atoms. The organic dispersing agent can also include one or more functional groups for bonding with a support material. Examples of suitable functional groups for bonding with the catalyst atoms and/or the support material include one or more of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. In a preferred embodiment, the organic dispersing agent is a polyacrylic acid or polyacrylate salt.

It is believed that adding the base to the reaction mixture can stabilize the metal particles formed in the reaction by preventing acids from disrupting the bonds between the organic dispersing agent and the metal particles. During the manufacture of the nanoparticles, protons (i.e., acid) can be formed when the metal ions are reduced. For example, if hydrogen is used as the reducing agent, protons are generated according to the following equation: $M^{2+}+H_2 \rightarrow M+2H^+$, where M is a metal such as Pt or Pd. The increase in protons lowers the pH of the reaction mixture.

The bond between the metal and the organic compound is maintained by the donation of an electron from the organic agent (e.g., $PAA^-$) to the metal (e.g., the empty $5d$ orbital of Pd or Pt). However, protons released during the reduction of the metal ions can compete for the electrons of the organic agent functional groups. This competitive bonding disrupts the bonding between the metal and the organic agent and can cause the free metal particles to agglomerate to form larger particles and/or precipitate.

The initial concentration of metal atoms affects the extent to which the reduction step changes the pH of the nanocatalyst composition. In a dilute solution of metals, the solvent can more easily buffer the increase in proton concentration. However, as the metal concentration increases, the reduction step has an increased effect on the change in pH and a corresponding increase in the disruption of the interaction between the metal atoms and the organic agent molecules. By adding a base, the effects of the pH increase can be offset via neutralization to maintain a more stable nanoparticle colloid.

These and other advantages and features of the present invention will become more fully apparent from the following description and appended claims as set forth hereinafter.

DETAILED DESCRIPTION OF THE PREFERRED EMBODIMENTS

I. Introduction

The present invention relates to metal colloids containing metal nanoparticles, methods of making the colloids, and supported nanocatalyst manufactured therefrom. The method for preparing the metal-containing colloids generally includes reacting a plurality of metal ions and a plurality of organic agent molecules in solution to form metal complexes. The metal complexes are reduced to form nanoparticles dispersed in the reaction mixture. A base is included in the reaction mixture to stabilize the nanoparticles and prevent agglomeration into larger particles and/or precipitation.

For purposes of the present invention, the term "particle size" refers to average particle size and "nanoparticle" refers to a particle having a particle size between about 1 nm and about 1000 nm.

II. Components Used to Make Metel-Containing Colloids and Supported Catalysts

A. Catalytic Metal Ions

Any metals or group of metals that can react to form a complex with the organic agent molecules can be used to form colloids according to the present invention. The catalytic metals can exhibit primary catalytic activity or can be used as promoters or modifiers. Exemplary metals include noble metals, base transition metals, and rare earth metals.

Examples of base transition metals that may exhibit catalytic activity include, but are not limited to, titanium, vanadium, chromium, manganese, iron, cobalt, nickel, copper, zinc, zirconium, molybdenum, tin, antimony, tungsten, and the like. These may be used alone, in various combinations with each other, or in combinations with other elements, such as noble metals, alkali metals, alkaline earth metals, rare earth metals, or non-metals.

Examples of noble metals, also referred to as platinum-group metals, which exhibit catalytic activity, include platinum, palladium, iridium, gold, osmium, ruthenium, rhodium, rhenium, and the like. These may be used alone, in various combinations with each other, or in combinations with other elements, such as base transition metals, alkali metals, alkaline earth metals, rare earth metals, or non-metals.

Examples of rare earth metals that exhibit catalytic activity include, but are not limited to, lanthanum and cerium. These may be used alone, in various combinations with each other, or in combinations with other elements, such as base transition metals, noble metals, alkali metals, alkaline earth metals, or non-metals.

Optionally, non-transition metals can also be included, typically as promoters or modifiers. Suitable non-transition metals include alkali metals and alkaline earth metals, such as sodium, potassium, magnesium, calcium, etc., and non-metals such as phosphorus, sulfur, oxygen, and halides.

B. Organic Dispersing Agents and Organic Dispersing Agent Molecules

The organic dispersing agent, also referred to as a dispersing agent or an organic dispersing agent, is selected to promote the formation of nanocatalyst particles that have a desired size, stability, and/or uniformity. The dispersing agent molecules react with the metal ions to form ligands complexed with the metal ions.

Dispersing agents suitable for bonding metal ions include a variety of small organic molecules, polymers and oligomers. The dispersing agent interacts and bonds with metal ions dissolved or dispersed within an appropriate solvent or carrier. Bonding can occur through various suitable mechanisms, including ionic bonding, covalent bonding, Van der Waals interaction/bonding, lone pair electron bonding, or hydrogen bonding.

To provide the bonding between the dispersing agent molecules and the metal ions, the dispersing agent molecules include one or more appropriate functional groups. In one embodiment, the functional groups comprise a carbon atom bonded to at least one electron-rich atom that is more electronegative than the carbon atom and that is able to donate one or more electrons so as to form a bond or attraction with a metal ion. Preferred dispersing agents include functional groups which have either a charge or one or more lone pairs of electrons that can be used to complex a metal ion. These functional groups allow the dispersing agent to have a strong binding interaction with the metal ions.

In an exemplary embodiment, the functional groups of the dispersing agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. The dispersing agent can be monofunctional, bifunctional, or polyfunctional.

Examples of suitable monofunctional dispersing agents include alcohols such as ethanol and propanol and carboxylic acids such as formic acid and acetic acid. Useful bifunctional dispersing agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional dispersing agents include sugars such as glucose, polyfunctional carboxylic acids such as citric acid, EDTA, pectins, cellulose, and the like. Other useful dispersing agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The dispersing agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the dispersing agent, it can also be advantageous to control the molar ratio of dispersing agent to the catalyst atoms in a catalyst suspension. A more useful measurement is the molar ratio between dispersing agent functional groups and catalyst atoms. For example, in the case of a divalent metal ion two molar equivalents of a monovalent functional group would be necessary to provide the theoretical stoichiometric ratio. Typically the molar ratio of dispersing agent functional groups to catalyst atoms is preferably in a range of about 0.001:1 to about 50:1. For hydrogen peroxide catalysts the ratio is advantageously in a range of about 0.5:1 to about 40:1, more preferably in a range from about 1:1 to about 35:1, and most preferably in a range of about 3:1 to about 30:1.

The use of the dispersing agent allows for the formation of very small and uniform nanoparticles. In general, the nanocatalyst particles formed in the presence of the dispersing agent are preferably less than about 20 nm in size. In some cases, the nanocatalyst particles may be atomically dispersed. The nanocatalyst particles more preferably have an average particle size less than about 15 nm, and most preferably less than about 10 nm.

Finally, depending on the desired stability of the nanocatalyst particles on the support material, the dispersing agent can be selected to bond (e.g., covalently bond) with the support material so as to anchor or tether the nanocatalyst particles and/or atoms to the support material. While the dispersing agent has the ability to inhibit agglomeration of the nanocatalyst particles in the absence of anchoring, chemically bonding the nanocatalyst particles to the support material through a ligand is a particularly effective mechanism for preventing agglomeration.

Suitable functional groups for bonding with the support are the same types of functional groups as those suitable for bonding to the metal ions. However, dispersing agent molecules can have different functional groups for bonding to the support and also for bonding to the metal ions.

C. Solvents

The metal ions are prepared in a solution that can be applied to a catalyst support material. The solution can contain various solvents, including water and organic solvents. Solvents participate in catalyst formation by providing a solution for the interaction of metal ions and the dispersing agent molecules. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

D. Basic Compounds

A basic compound (i.e., a base) is added to the reaction mixture to stabilize the nanoparticles formed in high concentrations. The basic compound can be a weak base or a strong base; however, weak bases are preferred. Examples of suitable weak bases include sodium bicarbonate, sodium carbonate, ammonium carbonate, ammonium bicarbonate, ammonium acetate, sodium acetate, sodium phosphate, ammonium phosphate; bicarbonates or carbonates of Li, Na, K, Rb, Cs, Be, Mg, Ca, Sr, Ba, ammonium and the like; organic bases such as aniline, pyridine, imidazoles, and amines (e.g., trimethyl amine, methylamine, or dimethylamine). Other examples of suitable basic compounds include hydroxides of Li, Na, K, Rb, Cs, Be, Mg, Ca, Sr, Ba, ammonium, and the like.

It is also possible to add the base as a solid material. For example, ion exchange resins that have basic functional groups can be used. The solid material can be easily separated from the final colloid using simple techniques such as centrifugation and filtration.

E. Reducing Agent

A reducing agent is used to reduce the metal ions to a lower oxidation state. Any compound capable of reducing the metal ions can be used. In a preferred embodiment, the reducing agent is hydrogen. Other suitable reducing agents include small organic molecules such as formaldehyde, formic acid, methanol, ethylene, and hydrides such as lithium aluminum hydride and sodium borohydride.

F. Support Materials

The nanocatalyst particles are deposited and/or formed on a support material. The support may be organic or inorganic. It may be chemically inert, or it may serve a catalytic function complementary to the nanocatalyst. The support may be in a variety of physical forms. It may be porous or nonporous. It may be a three-dimensional structure, such as a powder, granule, tablet, or extrudate. The support may be a two-dimensional structure such as a film, membrane, or coating. It may be a one-dimensional structure such as a narrow fiber.

One class of support materials includes porous, inorganic materials, such as alumina, silica, titania, kieselguhr, diatomaceous earth, bentonite, clay, zirconia, magnesia, metal oxides, zeolites, and calcium carbonate. Another useful class of supports includes carbon-based materials, such as carbon black, activated carbon, graphite, fluoridated carbon, and the like. Other supports include polymers and other inorganic solids, metals, and metal alloys.

The nanocatalyst particles can be deposited within a wide range of loadings on the support material. The loading can range from about 0.01% to about 70 wt % of the supported nanocatalyst particles, more preferably in a range of about 0.1% to about 25%. In the case where the support material is porous, it is preferable for the surface area to be at least about 20 $m^2$/g, more preferably at least about 50 $m^2$/g.

III. Methods of Making Colloids and Supported Nanocatalysts

The process for manufacturing colloids according to the present invention can be broadly summarized as follows. First, one or more types of catalytic metal atoms (e.g., in the form of a ground state metal or ionized metal salt) and one or more types of dispersing agent molecules (e.g., in the form of a carboxylic acid salt) are selected. The metal atoms and the dispersing agent molecules are dissolved in a solvent and reacted to form a plurality of complexed metal atoms. The complexed metal atoms are reduced with a reducing agent to form a plurality of nanocatalyst particles dispersed in the solvent, thereby forming a colloid. A base is included in the mixture to improve the stability of the particles. The base allows the particles to be manufactured as a colloid in a more concentrated form and/or allows the colloid to be concentrated after particle formation without causing significant precipitation of the nanoparticles.

The base is preferably added in sufficient quantity to stabilize the colloidal particles. In an exemplary embodiment an amount of base is added to raise the pH by about 0.25, more preferably 0.5. The base should be added in sufficient quantity to yield a solution preferably having a pH of at least about 4.5, more preferably at least about 4.75, and most preferably at least about 5.0.

The concentration of the metal in the final colloid can be increased as compared to colloids that are not stabilized with a base. In an exemplary embodiment the concentration of the metal in the final colloid is preferably greater than about 150 ppm by weight, more preferably greater than about 200 ppm by weight, and most preferably greater than about 300 ppm by weight.

It has been found that adding a basic compound to the reaction mixture improves the stability of the nanoparticles and allows the nanoparticles to remain dispersed in the solvent in higher concentrations than colloids prepared without the base. This stabilization of the colloidal particles has been observed for mixtures with different initial pH. It is believed that the addition of base can have a stabilizing effect that is apart from and/or in addition to a mere adjustment in pH. However, the invention is not limited to this theory.

The concentration of the metal in the colloid is a consequence of the ratio of solvent to metal ions. Increasing the amount of solvent decreases the metal concentration, while decreasing the amount of solvent increases the metal concentration. In the method of the present invention, the metal concentration can be determined by selecting an initial ratio of metal to solvent that provides the desired concentration ratio or alternatively, the ratio of metal to solvent can be increased after the nanoparticles are formed by removing a portion of the solvent. A combination of both of these embodiments can also be performed.

In the first embodiment, the colloid is prepared at full concentration (i.e., the concentration of the metal is close to or the same as the final concentration). The metal atoms, organic dispersing agent, solvent, base, and other components are mixed together in an appropriate amount of solvent such that the colloid will have a desired final concentration of metal. (e.g., 150 ppm by weight). In an alternative embodiment, the colloidal particles can be formed at a lower concentration and then a portion of the solvent can be removed to increase the metal concentration to a desired final concentration.

The base can be added to the reaction mixture at various points in the reaction sequence. In one embodiment, the base is added prior to or during formation of the colloidal nanoparticles. Protons created during the formation of the nanoparticles do not cause significant precipitation because of the added base. Preferably the base is added after the metal atoms are complexed with the organic dispersing agent such that the higher pH does not affect the formation of the organometallic complexes. Adding the base to the reaction mixture before particle formation can be advantageous because it allows the nanoparticles to be formed in a more concentrated mixture, thus avoiding the difficulty and expense of concentrating the colloid after particle formation. Although the present invention includes stabilizing the particles before or during particle formation and thereafter increasing the concentration of the metal particles in the colloid.

In an alternative embodiment, the base is added to the reaction mixture after nanoparticles form. The base is added before significant precipitation occurs. The amount of time available to add the base after particle formation depends on the concentration of metal and the temperature, and the pH of the colloid. Depending on the instability of the particles, the base may need to be added within a few minutes or a few hours.

In the case where the final concentration of the colloidal nanoparticles is achieved by removing a portion of the solvent, the concentration of the metal atoms is kept low such that formation of the particles does not create enough protons to destabilize the colloid. In this case the base can be added before, during, or just after the colloidal solution is concentrated. As solvent is removed, the metal concentration increases. However, since the protons are neutralized with base, there is not a corresponding increase in protons (i.e., drop in pH). In this manner, the concentration of the colloid can be increased without destabilizing the nanoparticles. Concentrating the colloid (i.e., after particle formation) can be advantageous where adding base to the reaction mixture adversely affects particle formation and/or performance.

IV. EXAMPLES

The following examples provide formulas for making concentrated colloids containing metal nanoparticles. The formulas in the examples were prepared using a $Pd^{2+}$ solution, a $Pt^{4+}$ solution, and a polyacrylate solution.

The $Pd^{2+}$ solution (0.0799 wt %) was prepared by dissolving 1.3339 g of $PdCl_2$ (Assay 59.57% Pd) in 4.76 g of HCl (12.1M) and diluting to 1000 ml with de-ionized water. The $Pt^{4+}$ solution (0.010 wt. % Pt) was prepared by diluting 0.2614 g of $H_2PtCl_6$ (Mw: 517.92, 39.85% Pt by weight) to 1000 ml with de-ionized water. The polyacrylate solution was prepared by diluting 15 mg of Poly(acrylic acid, sodium salt) solution (45 wt. % in water, MW 1200) to 100 g with de-ionized water.

Example 1

611 ppm Metal Concentrated Colloid

Example 2 describes a method for making a colloid with a metal concentration of 611 ppm by weight, according to the present invention. 75 ml of $Pd^{2+}$ solution (0.0799 wt %), 12 ml of $Pt^{4+}$ solution (0.010 wt %) and 10 ml polyacrylate solution (6.75 wt %) were mixed in a 250 ml flask. 0.125 g of NaHCO3 in 3 ml of de-ionized water was slowly added with stirring. The solution was purged for 1.5 hr with nitrogen (100 m/min), and then purge for 15 minutes with hydrogen (50 m/min). The flask was then sealed and allowed to stand overnight under stirring. After one week, this colloid still remained stable (i.e., no substantial precipitation was observed).

Example 2

367 ppm Metal Concentrated Colloid

Example 2 describes a method for making a colloid with a metal concentration of 367 ppm by weight, according to the present invention. 75 ml of $Pd^{2+}$ solution (0.0799 wt %), 12 ml of $Pt^{4+}$ solution (0.010 wt %) and 10 ml polyacrylate solution (6.75 wt %) were mixed and diluted to 163 ml with de-ionized water in a 250 ml flask. 0.125 g of $NaHCO_3$ in 3 ml of $H_2O$ was slowly added with stirring. The solution was purged for 1.5 hr with nitrogen (100 ml/min), and then purge for 15 minutes with hydrogen (50 ml/min). The flask was then sealed and allowed to stand overnight with stirring. After one week, the colloid still remained stable (i.e., no substantial precipitation was observed).

Example 3

367 ppm Metal Concentrated Colloid (Comparative)

Example 3 describes a method for forming a colloid using the same formula as in Example 3 except that no base was added. Example 3 was prepared for comparison with Example 2. 75 ml of the $Pd^{2+}$ solution (0.0799 wt %), 12 ml of the $Pt^{4+}$ solution (0.010 wt %) and 10 ml of the polyacrylate solution (6.75 wt %) were mixed and diluted to 166 ml with de-ionized water. The solution was purged for 1.5 hr with nitrogen (100 ml/min), and then purge for 15 minutes with hydrogen (50 ml/min). The flask was then sealed and allowed to stand overnight with stirring. On the following day, some precipitation of metal particles was observed on the bottom of the flask.

Example 4

61 ppm Metal Colloid Preparation (Comparative)

Example 4 describes a Standard Preparation method of manufacturing a colloid with a metal concentration of 61 ppm metal by weight (i.e., unconcentrated). 75 ml of the $Pd^{2+}$ solution (0.0799 wt %), 12 ml of the $Pt^{4+}$ solution (0.010 wt %) and 10 ml the polyacrylate solution (6.75 wt %) were mixed and diluted to 1000 ml with de-ionized water in a flask. The solution was purged for 1.5 hr with nitrogen (100 ml/min), and then for 0.5 hr with hydrogen (100 ml/min). The flask was then sealed and allowed to stand overnight with stirring. The colloid was stable for over a week.

Example 5

122 ppm Metal Colloid Preparation (Comparative)

Example 5 describes a method of manufacturing a colloid with a metal concentration of 122 ppm metal by weight. 75 ml of the $Pd^{2+}$ solution (0.0799 wt %), 12 ml of the $Pt^{4+}$ solution (0.010 wt %) and 10 ml of the polyacrylate solution (6.75 wt %) were mixed and diluted to 500 ml with de-ionized water in a flask. The solution was purged for 1.5 hr with nitrogen (100 ml/min), and then for 0.5 hr with hydrogen (100 ml/min). The flask was then sealed and allowed to stand overnight with stirring. The colloid was stable for over a week.

Examples 2-5 show the effect of concentrating the colloid and adding base or acid. The comparative concentrated colloid in Example 3 was not stable whereas the standard (i.e., unconcentrated) colloid of Example 4 was stable. The only difference between Examples 3 and 4 was the amount of solvent. Example 2, which had the same metal concentration as the unstable comparative colloid in Example 4 was made stable with the addition of base.

Example 6

367 ppm Metal Concentration Colloid (Comparative)

Example 6 describes a method for making a colloid with a metal concentration of 367 ppm metal by weight using an acid. Example 6 was prepared for comparison with Example 2, which was made using a base. 75 ml of $Pd^{2+}$ solution (0.0799 wt %), 12 ml of $Pt^{4+}$ solution (0.010 wt %), 10 ml polyacrylate solution (6.75 wt %) and 0.1 ml of HCl (12.1M) were mixed and diluted to 166 ml with de-ionized water in a 250 ml flask. The solution was purged for 1.5 hr with nitrogen (100 ml/min), and then switch to hydrogen flow (50 ml/min). After purging with $H_2$ for 7 minutes, black precipitate was observed on the bottom of the flask.

Example 7

367 ppm Metal Concentration Colloid (Comparative)

Example 7 describes a method for making a colloid with a metal concentration of 367 ppm metal by weight using an acid. Example 7 was prepared for comparison with Example 2, which was made using a base. 75 ml of the $Pd^{2+}$ solution (0.0799 wt %), 12 ml of $Pt^{4+}$ solution (0.010 wt %), 10 ml polyacrylate solution (6.75 wt %) and 0.598 ml of HCl (12.1 M) were mixed and diluted to 166 ml with de-ionized water in a 250 ml flask. The solution was purged for 1.5 hr with nitrogen (100 ml/min), and then with hydrogen (50 ml/min). After purging $H_2$ for only a few minutes, black precipitation was observed on the bottom of the flask. Examples 6 and 7 show that addition of acid has an undesired effect on particle stability compared to the addition of base.

Example 8

Manufacture of Supported Catalyst

Example 8 describes a method for manufacturing a supported catalyst using the colloid prepared in Example 1, according to the present invention. The supported catalyst with a loading of 0.1% Pd by weight was prepared as follows: sulfated silica beads (60 g) were placed in a 1 liter glass beaker. Sufficient amount of anhydrous methanol (99.5%) was added to cover the support. The support was allowed to soak in methanol for 1 hr. After the excess methanol was drained, 100 ml of the colloid prepared in Example 2 was added. The resulting solution was heated with continuous rotation under an IR lamp at a temperature of 70-80° C. This heating and drying step lasted for about 30 minutes until the drying process was complete. The resulting catalyst was then left in an oven (90° C.) overnight.

The catalyst was then reduced with hydrogen gas using the following procedure: (i) purge at room temperature with nitrogen (100 ml/min) for 15 minutes; (ii) switch to hydrogen (100 ml/min); (iii) heat to 90° C. over 0.5 hour; (iv) hold for 2 hours at 90° C.; (v) ramp to 175° C. over 0.5 hour; (vi) then hold for 17 hours at 175° C. At the completion of the 17 hour hold, the catalyst was cooled to 150° C. and the reactor was purged with nitrogen (100 ml/min) at 150° C. for 4 hours. After final cooling the catalyst was ready for use.

Example 9

Manufacture of Supported Catalyst (Comparative)

Example 9 describes a method for manufacturing a supported catalyst using the comparative colloid prepared in Example 5. The supported catalyst with a loading of 0.1% Pd by weight was prepared as follows: sulfated silica beads (60 g) were placed in a 1 liter glass beaker. Sufficient amount of anhydrous methanol (99.5%) was added to cover the support. The support was allowed to soak in methanol for 1 hr. After the excess methanol was drained, 100 ml of the colloid prepared in Example 2 was added. The resulting solution was heated with continuous rotation under an IR lamp at a temperature of 70-80° C. This heating and drying step lasted for about 30 minutes until the drying process was complete. The resulting catalyst was then left in an oven (90° C.) overnight.

The catalyst was then reduced with hydrogen gas using the following procedure: (i) purge at room temperature with nitrogen (100 ml/min) for 15 minutes; (ii) switch to hydrogen (100 ml/min); (iii) heat to 90° C. over 0.5 hour; (iv) hold for 2 hours at 90° C.; (v) ramp to 175° C. over 0.5 hour; (vi) then hold for 17 hours at 175° C. At the completion of the 17 hour hold, the catalyst was cooled to 150° C. and the reactor was purged with nitrogen (100 ml/min) at 150° C. for 4 hours. After final cooling the catalyst was ready for use.

Example 10

Use of Supported Catalyst in H2O2 Process

Example 10 describes a method for manufacturing H2O2 using the supported catalyst of Example 8. 6.15 g of the catalyst manufactured in Example 8 (containing 0.1% wt % Pd) was charged to a tubular fixed bed reactor with a nominal diameter of 0.5 inches. The tubular reactor was operated at a pressure of 750 psig, and maintained at an internal temperature of 35° C. The tubular reactor was fed continuously with 2000 sccm (standard cubic centimeters per minute) of a gas feed containing 3 vol % hydrogen, 40 vol % oxygen, and the balance inert gas. The reactor was also fed continuously with 36 cc/hr of a liquid feed containing 4 wt % water, 400 ppmw H2SO4, and 15 ppmw NaBr and the balance methanol. Gaseous and liquid effluents from the tubular reactor were collected continuously and analyzed to obtain data on the amount of hydrogen converted and the amount of hydrogen peroxide generated. Based on these measurements, the hydrogen conversion was determined to be 60%, the selectivity to hydrogen peroxide (based on hydrogen converted) to be 71% and the productivity (g H2O2 produced per g Pd per hour) to be 390 g H2O2/g Pd/hr.

Example 11

Use of Supported Catalyst in H2O2 Process (Comparative)

Example 11 describes a method for manufacturing H2O2 using the supported catalyst of Example 9 (comparative). 6.15 g of the catalyst manufactured in Example 9 (containing 0.1% wt % Pd) was charged to the tubular reactor of Example 10. Reaction conditions, feed rates and compositions were the same as Example 10, with the exception that the feed rate was 2200 sccm. Based on effluent analysis, the hydrogen conversion was found to be 63%, the selectivity to hydrogen peroxide (based on hydrogen converted) to be 69%, and the productivity to be 450 g H2O2/g Pd/hr.

The results from Examples 10 and 11 demonstrate that a catalyst made with the high concentration colloid of the present invention gives performance that is essentially equivalent to a comparative catalyst made using a low concentration colloid. In particular, the selectivity towards hydrogen peroxide production for the catalyst of the present invention is equal to or higher than that of the comparative catalyst.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for making a stabilized concentrated metal colloid, comprising:
   (i) mixing together a solvent, a plurality of metal atoms, and a plurality of organic agent molecules, each organic agent molecule comprising at least one functional group capable of forming an anion having an electron for donation to and bonding with a metal atom;
   (ii) reacting the metal atoms with the organic agent molecules to form a mixture comprising a plurality of complexed metal atoms in which anions provided by the organic agent molecules are complexed with the metal ions;
   (iii) reducing the complexed metal atoms in the mixture using a reducing agent to form a plurality of nanoparticles, the reducing agent releasing acidic protons during reduction of the metal ions; and
   (iv) adding an amount of a weak base to the mixture in order to raise the pH to at least about 4.5 and counteract acidification resulting from the reduction of the metal atoms, thereby improving the stability of the nanoparticles in the mixture,
      wherein the weak base comprises at least one base selected from the group consisting of animonium acetate, sodium acetate, sodium phosphate, ammonium phosphate, organic bases, aniline, pyridine, imidazoles, trimethyl amine, methylamine, dimethylamine, and carbonates or bicarbonates of Na, Li, K, Rb, Cs, Be, Mg, Ca, Sr, Ba, or ammonium,
      wherein the final concentration of metal in the mixture is at least about 150 ppm by weight.

2. A method as in claim 1, wherein the final concentration of metal in the mixture is at least about 200 ppm by weight.

3. A method as in claim 1, wherein the final concentration of metal in the mixture is at least about 300 ppm by weight.

4. A method as in claim 1, wherein the reducing agent is hydrogen gas.

5. A method as in claim 1, wherein the weak base is added before the nanoparticles are formed.

6. A method as in claim 1, wherein the weak base is added after the nanoparticles are formed.

7. A method as in claim 1, wherein the amount of weak base added raises an initial pH of the mixture by at least about 0.25.

8. A method as in claim 1, wherein the amount of weak base added raised an initial pH of the mixture by at least about 0.5.

9. A method as in claim 1, further comprising removing a portion of the solvent to achieve the final concentration of metal in the mixture.

10. A method of manufacturing a supported catalyst comprising depositing the nanoparticles of claim 1 on a catalyst support material.

11. A colloidal suspension of nanoparticles manufactured according to the method of claim 1.

12. A method for making a supported catalyst, comprising:
   (i) mixing together a solvent, a plurality of metal atoms, and a plurality of organic agent molecules, each organic agent molecule providing at least one anion;
   (ii) reacting the metal atoms with the organic agent molecules in a solvent to form a mixture comprising a plurality of complexed metal atoms in which anions provided by the organic agent molecules are complexed with the metal ions, wherein the concentration of metal atoms in the mixture is greater than about 150 ppm by weight;
   (iii) reducing the complexed metal atoms in the mixture using hydrogen gas as a reducing agent to form a plurality of nanoparticles having a particle size less than 20 nm, the nanoparticles forming a colloid, the reducing agent releasing acidic protons during reduction of the metal ions;
   (iv) adding an amount of a weak base to the mixture to raise the pH by at least about 0.25 and counteract acidification resulting from the reduction of the metal atoms, thereby improving the stability of the nanoparticles in the mixture and forming a stabilized metal colloid, wherein the weak base comprises at least one base selected from the group consisting of ammonium acetate, sodium acetate, sodium phosphate, animonium phosphate, organic bases, aniline, pyridine, imidazoles, trimethyl amine, methylamine, dimethylamine, and carbonates or bicarbonates of Na, Li, K, Rb, Cs, Be, Mg, Ca, Sr, Ba, or ammonium; and
   (v) contacting the stabilized metal colloid with a catalyst support material and removing the liquid portion of the colloid to yield a supported catalyst, the catalyst support material comprising a powder, granule, tablet, or extrudate.

13. A method as in claim 12, wherein the concentration of metal atoms is greater than about 200 ppm by weight.

14. A method as in claim 12, wherein the concentration of metal atoms is greater than about 300 ppm by weight.

15. A method as in claim 12, wherein the amount of weak base added raises the pH of the mixture by at least about 0.5.

16. A method of manufacturing hydrogen peroxide comprising reacting hydrogen and oxygen in the presence of the catalyst formed according to the method of claim 12.

17. A concentrated stabilized colloidal metal composition, comprising:
   an aqueous solvent;
   a plurality of nanoparticles having a paraticle size less than about 20 nm suspended in the aqueous solvent thereby forming a colloidal composition, each nanoparticle comprising a plurality of metal atoms and having a plurality of organic dispersing agent molecules bonded to at least a portion of the metal atoms, the organic dispersing agent molecules including anionic functional groups, wherein the metal atoms have a concentration greater than about 150 ppm by weight; and
   at least one of a weak base or reaction product thereof in order for the colloidal composition to have a pH greater than about 5.0 and such that the colloidal nanoparticles are substantially stable in the aqueous solvent,
   wherein the weak base comprises at least one base selected from the group consisting of animonium acetate, sodium acetate, sodium phosphate, ammonium phosphate, organic bases, aniline, pyridine, imidazoles, trimethyl amine, methylamine, dimethylamine, and carbonates or bicarbonates of Na, Li, K, Rb, Cs, Be, Mg, Ca, Sr, Ba, or ammomum.

18. A concentrated colloidal metal composition as in claim 17, wherein the concentration of metal atoms is greater than about 200 ppm.

19. A concentrated colloidal metal composition as in claim 17, wherein the concentration of metal atoms is greater than about 300 ppm.

20. A method as in claim 1, wherein the solvent is an aqueous solvent and wherein the organic agent molecules are selected from the group consisting of carboxylic acids, sulfonic acids, formic acid, acetic acid, oxalic acid, malic acid, malonic acid, maleic acid, succinic acid, hydroxy acids, glycolic acid, lactic acid, citric acid, amino acids, glycine, EDTA, polyacrylic acid, polyacrylates, polyvinylbenzoates, polyvinyl sulfate, polyvinyl sulfonate, polybisphenol carbonates, and sulfonated polyethylene terephthalate.

21. A method as in claim 12, wherein the solvent is aqueous and the organic agent molecules are selected from the group consisting of carboxylic acids, sulfonic acids, formic acid, acetic acid, oxalic acid, malic acid, malonic acid, maleic acid, succinic acid, hydroxy acids, glycolic acid, lactic acid, citric acid, amino acids, glycine, EDTA, polyacrylic acid, polyacrylates, polyvinylbenzoates, polyvinyl sulfate, polyvinyl sulfonate, polybisphenol carbonates, and sulfonated polyethylene terephthalate.

22. A concentrated colloidal metal composition as in claim 17, wherein the organic dispersing agent molecules are selected from the group consisting of carboxylic acids, sulfonic acids, formic acid, acetic acid, oxalic acid, malic acid, malonic acid, maleic acid, succinic acid, hydroxy acids, glycolic acid, lactic acid, citric acid, amino acids, glycine, EDTA, polyacrylic acid, polyacrylates, polyvinylbenzoates, polyvinyl sulfate, polyvinyl sulfonate, polybisphenol carbonates, and sulfonated polyethylene terephthalate.

* * * * *

UNITED STATES PATENT AND TRADEMARK OFFICE
CERTIFICATE OF CORRECTION

PATENT NO. : 7,718,710 B2
APPLICATION NO. : 11/378057
DATED : May 18, 2010
INVENTOR(S) : Zhang et al.

It is certified that error appears in the above-identified patent and that said Letters Patent is hereby corrected as shown below:

Title Page
Item 56, U.S. PATENT DOCUMENTS, insert the reference --2005/0009696   1/2005   Mao et al.--

Column 1
Line 42, change "nanoparticles catalyst" to --nanoparticle catalysts--

Column 2
Line 56, change "nanocatalyst" to --nanocatalysts--

Column 3
Line 1, change "Metel-Containing" to --Metal-Containing--
Lines 49-50, change "Van der Waals" to --van der Waals--

Column 4
Line 33, change "metal ion" to --metal ion,--

Column 6
Line 15, after "embodiment" insert --,--
Line 54, change "metal." to --metal--

Column 7
Line 13, change "metal and the temperature" to --metal, the temperature--
Line 45, change "Mw:" to --MW:--
Line 48, change "MW 1200" to --MW: 1200--
Line 61, change "NaHCO3" to --NaHCO$_3$--
Line 63, change "purge" to --purged--

Column 8
Line 12, change "purge" to --purged--
Line 23, change "Example 3" to --Example 2--
Line 25, unbold "12"
Line 29, change "purge" to --purged--

Signed and Sealed this

Twenty-third Day of November, 2010

David J. Kappos
*Director of the United States Patent and Trademark Office*

CERTIFICATE OF CORRECTION (continued)
U.S. Pat. No. 7,718,710 B2

Column 9
Line 18, change "switch" to --switched--
Line 51, change "Sufficient amount" to --A sufficient amount--

Column 10
Line 12, change "Sufficient amount" to --A sufficient amount--
Line 33, change "H2O2" to --$H_2O_2$--
Line 35, change "H2O2" to --$H_2O_2$--
Line 37, change "0.1% wt %" to --0.1 wt %--
Line 46, change "H2SO4" to --$H_2SO_4$--
Line 53, change "H2O2" to --$H_2O_2$--
Line 54, change "H2O2/g" to --$H_2O_2$/g--
Line 58, change "H2O2" to --$H_2O_2$--
Line 61, change "H2O2" to --$H_2O_2$--
Line 64, change "0.1% wt %" to --0.1 wt %--

Column 11
Line 3, change "H2O2/g" to --$H_2O_2$/g--
Line 43, change "animonium" to --ammonium--

Column 12
Line 30, change "animonium" to --ammonium--
Line 52, change "paraticle" to --particle--
Line 66, change "animonium" to --ammonium--